(12) United States Patent
Winkelmann

(10) Patent No.: US 12,545,394 B2
(45) Date of Patent: Feb. 10, 2026

(54) WING FOR AN AIRCRAFT

(71) Applicant: Airbus Operations GmbH, Hamburg (DE)

(72) Inventor: Christoph Winkelmann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/764,970

(22) Filed: Jul. 5, 2024

(65) Prior Publication Data

US 2025/0010973 A1    Jan. 9, 2025

(30) Foreign Application Priority Data

Jul. 7, 2023    (DE) .................... 10 2023 118 070.3

(51) Int. Cl.
*B64C 3/56* (2006.01)
*B64C 3/54* (2006.01)
*B64C 23/06* (2006.01)

(52) U.S. Cl.
CPC ............... *B64C 3/56* (2013.01); *B64C 3/546* (2013.01); *B64C 23/072* (2017.05)

(58) Field of Classification Search
CPC .......... B64C 3/56; B64C 23/072; B64C 3/54; B64U 20/50
See application file for complete search history.

(56) References Cited

U.S. PATENT DOCUMENTS

| | | | |
|---|---|---|---|
| 8,777,153 B2 | 7/2014 | Parker | |
| 9,211,946 B2 | 12/2015 | Good et al. | |
| 11,098,767 B2 | 8/2021 | Dussart et al. | |
| 11,319,054 B2 | 5/2022 | Weder | |
| 2019/0152578 A1* | 5/2019 | Dege | B64C 3/546 |
| 2019/0152624 A1* | 5/2019 | Dege | G01N 3/22 |
| 2019/0322351 A1 | 10/2019 | Lorenz | |
| 2020/0070953 A1* | 3/2020 | Tzabari | F16H 48/24 |

(Continued)

FOREIGN PATENT DOCUMENTS

| | | |
|---|---|---|
| EP | 3689738 A1 | 8/2020 |
| WO | 2019061473 A1 | 4/2019 |

OTHER PUBLICATIONS

Search Report for DE Application No. 10 2023 118 070.3 dated Nov. 16, 2023, 11 pages.

(Continued)

*Primary Examiner* — Rodney A Bonnette

(74) *Attorney, Agent, or Firm* — Nixon & Vanderhye P.C.

(57) ABSTRACT

A wing (3) for an aircraft (1) including a fixed wing (5), a foldable wing tip portion (9) mounted to the fixed wing (5) via a hinge (11) in a manner rotatable about a hinge axis (13) between an extended position and a folded position, an actuation device (24) for actuating the foldable wing tip portion (9) for movement between the extended position and the folded position, and an arresting device (37) for arresting the foldable wing tip portion (9) in the extended position and/or in the folded position. The arresting device (37) includes a clutch device (39) configured for selectively holding the foldable wing tip portion (9) in a fixed position relative to the fixed wing (7) and releasing the foldable wing tip portion (9) for movement relative to the fixed wing (7) about the hinge axis (13).

16 Claims, 3 Drawing Sheets

(56) References Cited

U.S. PATENT DOCUMENTS

| 2020/0086986 | A1* | 3/2020 | LeGrand | B64U 10/20 |
| 2020/0324885 | A1* | 10/2020 | Bernard | B64U 10/20 |
| 2022/0177117 | A1* | 6/2022 | Older | B64C 23/072 |
| 2022/0266984 | A1 | 8/2022 | Winkelmann | |

OTHER PUBLICATIONS

European Search Report cited in EP 24184817.5 mailed Sep. 30, 2024, 10 pages.
European patent application 24 184 817.5, Examination Report, Nov. 11, 2025, (8 pages).

* cited by examiner

WING FOR AN AIRCRAFT

RELATED APPLICATION

This application incorporates by reference and claims priority to German patent application DE 10 2023 118 070.3, filed Jul. 7, 2023.

TECHNICAL FIELD

The present invention relates to an aircraft wing including a fixed wing and a foldable wing tip portion. A further aspect of the invention relates to a clutch device for such a wing. Yet a further aspect of the invention relates to an aircraft comprising such a wing and/or comprising such a clutch device.

BACKGROUND AND SUMMARY

A wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing such as in a common plane with the fixed wing, and a folded position, where the foldable wing tip portion extends upwards or rearwards in order to reduce the overall span of the aircraft compared to the extended position. When the foldable wing tip portion is foldable upwards, the hinge axis may extend in a horizontal plane and/or in parallel to a chord line and/or in parallel to the wing surface and/or in a flight direction of the aircraft and/or in parallel to a longitudinal axis of the aircraft. Alternatively, when the foldable wing tip portion is foldable rearwards, the hinge axis may extend in a vertical direction and/or in a wing depth direction and/or in a direction transverse or perpendicular to the wing surface.

The hinge may comprise at least one tip hinge part mounted, such as fixedly mounted, to the foldable wing tip portion and at least one wing hinge part mounted, such as fixedly mounted, to the fixed wing and engaging the tip hinge part, directly or indirectly via e.g. a shaft, in a manner rotatable about the hinge axis.

The wing further comprises an actuation device for actuating the foldable wing tip portion for movement between the extended position and the folded position. The actuation device may comprise one or more geared rotary actuators coupled between the foldable wing tip portion and the fixed wing, such as along the hinge axis, and driven by a common drive shaft that in turn is driven by a power drive unit that might be powered e.g. hydraulically or electrically. The actuation device might also comprise one or more position sensors to determine the actuation position of the geared rotary actuators, one or more gear units to transform the high speed-low torque rotation of the drive shaft into a low speed-high torque rotation of the geared rotary actuators, and a safety brake configured to brake the actuation device, when required to slow or stop the rotation of the foldable wing tip portion between the folded and extended positions.

The wing also comprises an arresting device for arresting the foldable wing tip portion in the extended position and/or in the folded position, relative to the fixed wing. The arresting device may be capable of transferring all structural loads applied during flight and/or on ground.

Foldable wings are developed to reduce the space requirements of an aircraft during maneuver and parking on ground. As soon as the aircraft has landed the foldable wing tip portions of the wings are folded upwards or rearwards, thereby reducing the overall span of the aircraft.

Some known foldable wings have separate ground and flight arresting devices, wherein the ground arresting device arrests the foldable wing tip portion in the folded position when the aircraft is on the ground, and the flight arresting device arrests the foldable wing tip portion in the extended position during flight of the aircraft. Some arresting devices of known wings comprise a lug and a bolt for engaging the lug in the arrested position. Such lug and bolt have to be maintained regularly and cleaned from dirt.

The invention may be embodied as a wing having a simple, reliable and efficient arresting device. The arresting device may include a clutch device configured for selectively a) holding the foldable wing tip portion in a fixed position relative to the fixed wing and b) releasing the foldable wing tip portion for movement relative to the fixed wing about the hinge axis by the actuation device.

In such a way, only one arresting device is required for arresting the foldable wing tip portion in both the extended position and the folded position, so that weight, complexity and maintenance efforts can be reduced. Further, a lug-and-bolt arresting unit can be avoided thereby reducing maintenance and cleaning efforts. As a result, a simple, reliable and efficient arresting device can be achieved.

According to an embodiment, the clutch device comprises at least one pair of clutch parts, such as two, four or other number of pairs of clutch parts. At least one or two of the clutch parts are arranged near a leading edge and/or near a front spar of the fixed wing and/or of the foldable wing tip portion, and at least one or two clutch parts are arranged near a trailing edge and/or near a rear spar of the fixed wing and/or of the foldable wing tip portion. Each pair of clutch parts includes a wing clutch part mounted to the fixed wing and a tip clutch part mounted to the foldable wing tip portion. The wing clutch part and the tip clutch part might be e.g. in the form of a disc or a plate. The wing clutch part is mounted to the fixed wing such as in a fixed manner or a torque-proof manner where rotation about an axis is inhibited while linear movement along the axis is allowed to a certain extent, the axis may be a hinge axis or coinciding with the hinge axis. The tip clutch part is mounted to the foldable wing tip portion such as in a fixed manner or at least in a torque-proof manner where rotation about an axis is inhibited while linear movement along the axis is allowed to a certain extent, the axis may be the hinge axis or coinciding with the hinge axis. The wing clutch part and the tip clutch part can be moved relative to one another between an engaged position and a disengaged position, such as along the hinge axis. In the engaged position the tip clutch part is held in a fixed position relative to the wing clutch part, so that the foldable wing tip portion is held in a fixed position relative to the fixed wing. In the disengaged position the tip clutch part is moveable relative to the wing clutch part, such as rotatable about a clutch axis that may coincide with the hinge axis, so that the foldable wing tip portion is movable relative to the fixed wing. The actuation device may be unloaded when the clutch parts are in the engaged position. In such a way, a simple and efficient clutch device is formed.

Movement of the wing clutch part and the tip clutch part between the engaged position and the disengaged position may be carried out by moving the wing and tip clutch parts relative to one another, such as along the clutch axis, independent from the position, such as the axial position, of the foldable wing tip portion relative to the fixed wing, or alternatively might be carried out by the entire foldable wing tip portion being moved, such as axially moved, relative to the fixed wing and the tip clutch part may be fixedly mounted to the foldable wing tip portion. Both alternatives are feasible and have their own advantages. The first alternative might allow a simpler clutch actuation while the second alternative might allow a simpler clutch mounting.

The clutch device may be configured such that the wing clutch part and the tip clutch part are in the engaged position when the foldable wing tip portion is in the extended position and/or in the folded position, and such that the wing clutch part and the tip clutch part are in the disengaged position when the foldable wing tip portion is moved between the extended position and the folded position. In such a way, the single clutch device can be used to arrest the foldable wing tip portion in both the extended position and the folded position.

The wing clutch part may have a wing engagement surface and the tip clutch part has a tip engagement surface. In the engaged position of the wing clutch part and the tip clutch part the wing engagement surface is engaged to the tip engagement surface. The wing engagement surface and the tip engagement surface may extend in parallel and may be moved to the engaged position in a linear engagement direction normal to the wing and tip engagement surfaces and may be parallel to the hinge axis. In such a way, a simple and efficient clutch device is formed.

The wing engagement surface and/or the tip engagement surface may be essentially smooth and configured to engage to one another by friction. Such a coupling by friction relates to a very simple and efficient clutch design.

The wing engagement surface and the tip engagement surface may be uneven and configured to engage to one another by positive-locking of the uneven structure on the wing engagement surface and the tip engagement surface. Such a coupling by positive-locking relates to a very strong and effective clutch design.

The wing engagement surface and the tip engagement surface may be toothed and configured to engage to one another by meshing of the teeth. This relates to a very strong and effective clutch coupling, while the engaged teeth may also serve to define a precise position of the tip clutch part relative to the wing clutch part.

The wing engagement surface and the tip engagement surface may have at least one projection and the other one of the wing engagement surface and the tip engagement surface may have at least one recess configured for being engaged by the projection for engagement of the wing engagement surface and the tip engagement surface. This relates to another very strong and effective clutch coupling, while the engaged projection and recess may serve to define a precise position of the tip clutch part relative to the wing clutch part.

The at least one projection may be formed as at least one bolt and the at least one recess is formed as at least one bore, such that the bolt engages the bore for engagement of the wing engagement surface and the tip engagement surface. Multiple bolts and multiple bores may be provided that are arranged in a circular manner, for example. This relates to another very strong and effective clutch coupling, while the engaged bolts and bores may serve to define a precise position of the tip clutch part relative to the wing clutch part.

The clutch device may be configured such that the wing clutch part and the tip clutch part are moved between the engaged position and the disengaged position along a linear engagement direction that may be parallel to the hinge axis. This relates to a very simple and efficient clutch design.

The clutch device may be arranged aligned with the hinge axis. The clutch device may define a clutch axis about which the wing clutch part and the tip clutch part rotate relative to one another when the foldable wing tip portion is rotated about the hinge axis relative to the fixed wing. The clutch axis may extend perpendicularly to wing engagement surface and/or to the tip engagement surface and parallel to the engagement direction. The clutch axis may coincide with the hinge axis. This relates to a very simple and efficient clutch arrangement.

The clutch device may comprise a biasing device, such as e.g. one or more linear springs, configured for biasing the wing clutch part and the tip clutch part towards the engaged position. The clutch device may comprise a clutch actuation unit configured for moving the wing clutch part and the tip clutch part towards the disengaged position against the biasing force of the biasing device. The clutch actuation unit may, for example, comprise several distinct actuators distributed over the wing clutch part and/or the tip clutch part. This allows a very simple and efficient clutch actuation.

The clutch device may comprise a locking device for locking the wing clutch part and the tip clutch part in the engaged position. The locking device may comprise a blocking element that can be moved or adjusted such that it blocks the tip clutch part from being moved out of engagement with the wing clutch part and/or such that it blocks the wing clutch part from being moved out of engagement with the tip clutch part. The blocking element might be formed e.g. as a plate or disc that can be moved or adjusted between the tip clutch part and the portion of the foldable wing tip portion or related hinge part against which the biasing device is supported. By the locking device the clutch device can be reliably secured in the engaged position.

The clutch device may comprises at least two pairs, such as four pairs, of clutch parts arranged along the hinge axis, such as in a distributed manner between leading edge and trailing edge of the wing, wherein each pair of clutch parts includes a wing clutch part mounted to the fixed wing and a tip clutch part mounted to the foldable wing tip portion, as described in connection with any of the embodiment above. By employing several clutch pairs, effectivity of the clutch device can be increased and loads can be distributed.

A further aspect of the present invention relates to a clutch device for the wing according to any of the afore-described embodiments. The features and effects described above in connection with the wing apply vis-à-vis to the clutch device.

Yet a further aspect of the present invention relates to an aircraft comprising a wing according to any of the embodiment described above or to a clutch device according to any of the embodiments described above. The features and effects described above in connection with the wing and the clutch device apply vis-à-vis to the aircraft.

SUMMARY OF DRAWINGS

Hereinafter, an embodiment of the invention is illustrated in the attached drawings which include.

DETAILED DESCRIPTION

Figure 1:
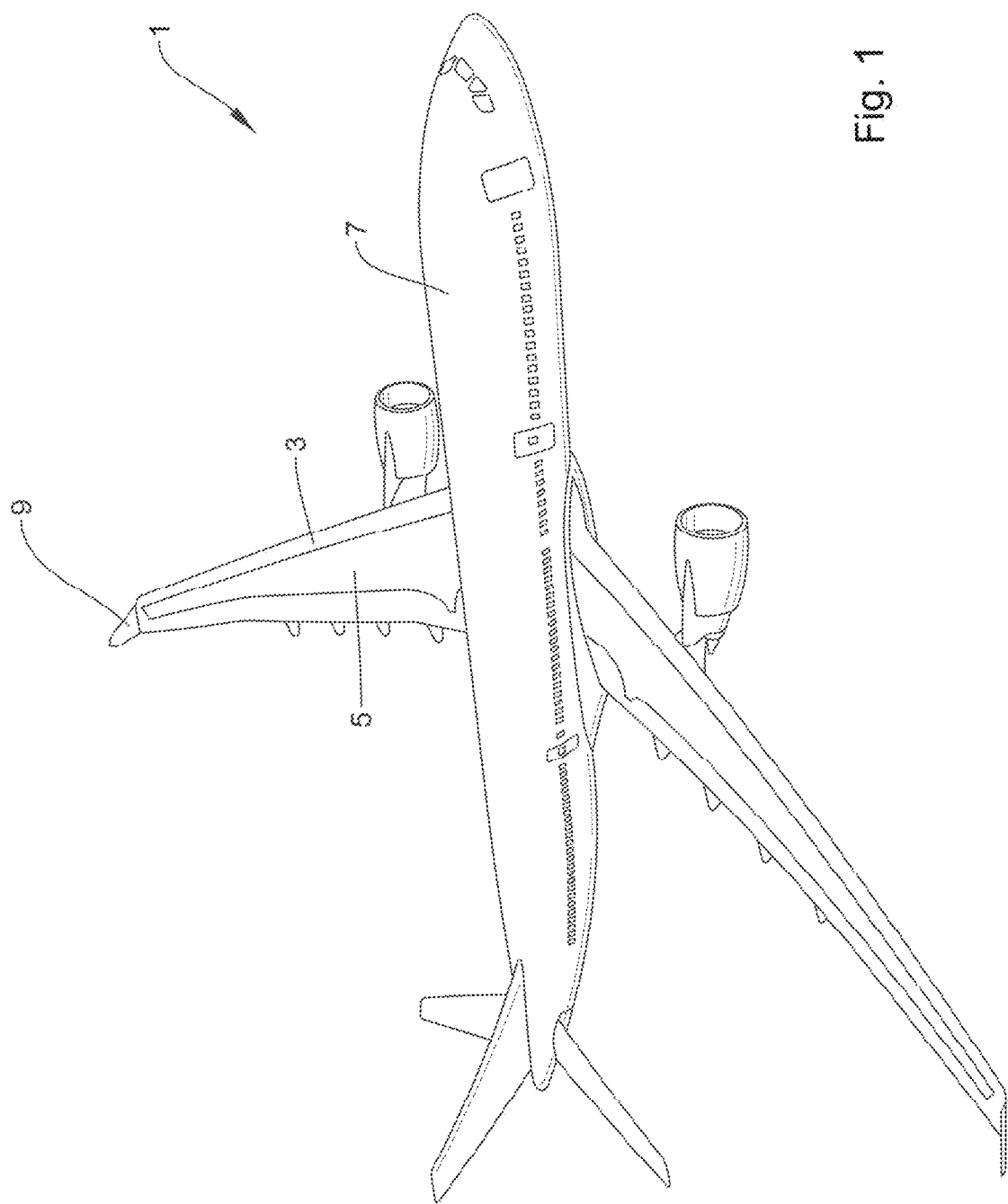
FIG. 1 is a perspective view of an aircraft according to an embodiment of the invention.

FIG. 1 shows an aircraft 1 comprising wings 3 and a fuselage 7. Each wing 3 comprises a fixed wing 5 and a foldable wing tip portion 9.

Figure 2:
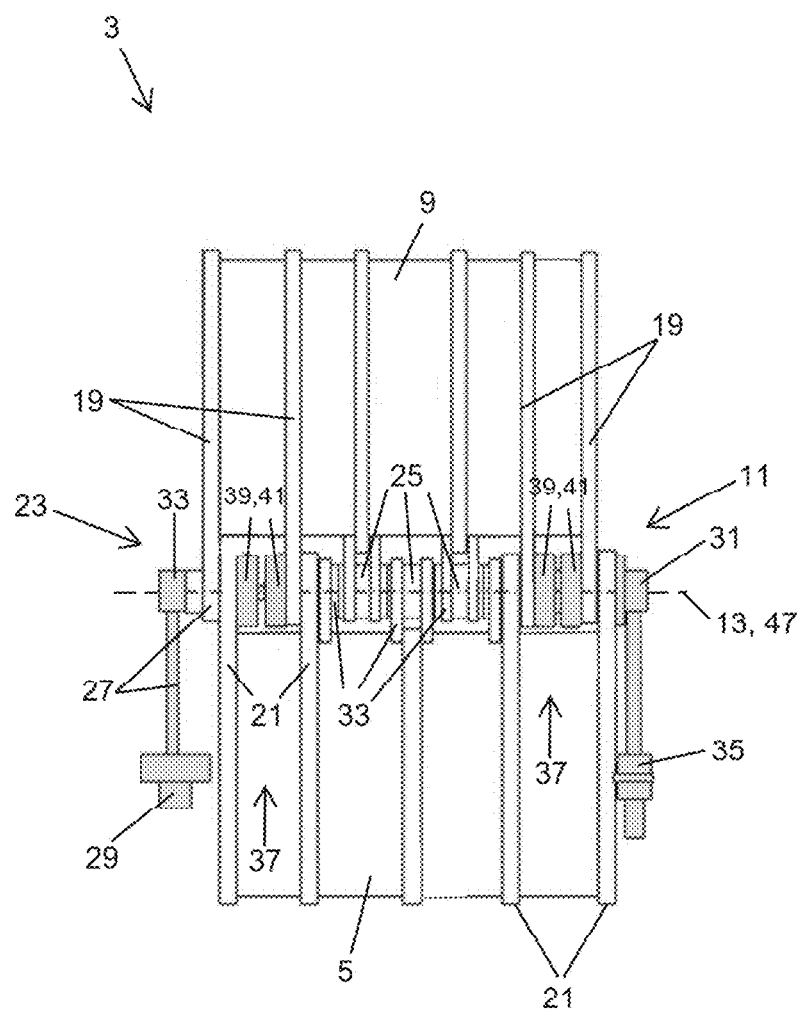
FIG. 2 is a schematic top view of a wing according to an embodiment of the invention, with a view on the hinge between the fixed wing and the foldable wing tip portion.

FIG. 2 illustrates an embodiment of the wing 3 of the aircraft 1 shown in FIG. 1 in further detail. The foldable wing tip portion 9 is mounted to the fixed wing 5 via a hinge 11 rotatable about a hinge axis 13 between an extended position and a folded position. In the extended position the foldable wing tip portion 9 extends as a continuous extension of the fixed wing 5 in a common plane with the fixed wing 5, wherein in the folded position the foldable wing tip portion 9 extends upwards in order to reduce the overall span of the aircraft 1. The hinge axis 13 extends in parallel to a chord line of the wing 3.

The hinge 11 comprises several tip hinge parts 19 fixedly mounted to the foldable wing tip portion 9 and several wing hinge parts 21 fixedly mounted to the fixed wing 5 and engaging the tip hinge part 19 via a hinge shaft in a manner rotatable about the hinge axis 13.

The wing 3 further comprises an actuation device 23 for actuating the foldable wing tip portion 9 for movement between the extended position and the folded position. The actuation device 23 comprises several geared rotary actuators 25 coupled between the foldable wing tip portion 9 and the fixed wing 5 along the hinge axis 13 and driven by a common drive shaft 27 that in turn is driven by a power drive unit 29 that might be powered e.g. hydraulically or electrically. The actuation device 23 also comprises position sensors 31 to determine the actuation position of the geared rotary actuators 25, gear units 33 to transform the high speed-low torque rotation of the drive shaft 27 into a low speed-high torque rotation of the geared rotary actuators 25, and a safety brake 35 configured to brake the actuation device 23 at any time when required.

The wing 3 also comprises an arresting device 37 for arresting the foldable wing tip portion 9 in the extended position and in the folded position relative to the fixed wing 5. The arresting device 37 is configured to transfer all structural loads applied during flight and on ground.

The arresting device 37 comprises a clutch device 39 configured for selectively a) holding the foldable wing tip portion 9 in a fixed position relative to the fixed wing 5 and b) releasing the foldable wing tip portion 9 for movement relative to the fixed wing 5 about the hinge axis 13 by the actuation device 23.

Figure 3:
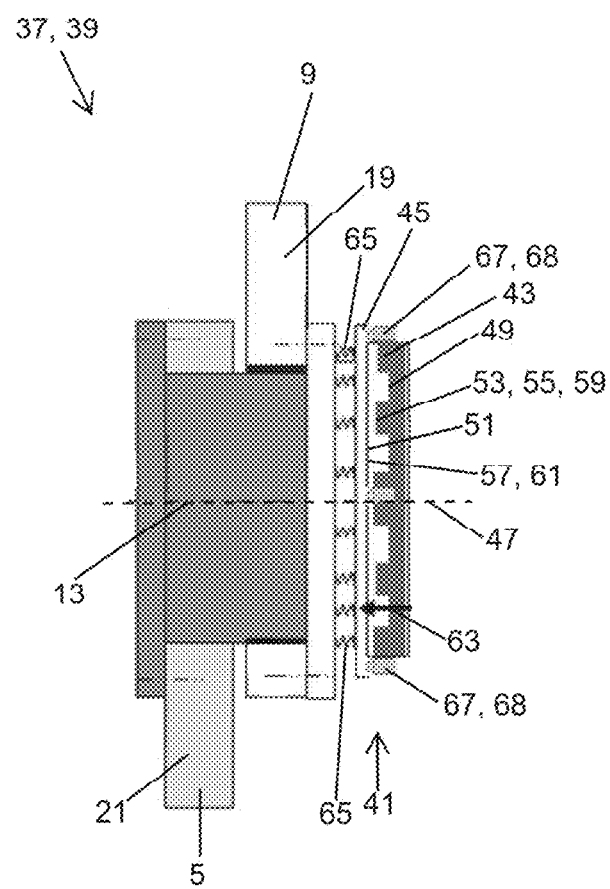
FIG. 3 is a schematic side view of the clutch device of the wing shown in FIG. 2.

As shown in FIG. 2, the clutch device 39 comprises four pairs of clutch parts 41. Two pairs of clutch parts 41 are arranged near a leading edge and near a front spar of the fixed wing 5 and of the foldable wing tip portion 9, and two pairs of clutch parts 41 are arranged near a trailing edge and near a rear spar of the fixed wing 5 and of the foldable wing tip portion 9. As shown in FIG. 3, each pair of clutch parts 41 includes a wing clutch part 43 mounted to the fixed wing 5 and a tip clutch part 45 mounted to the foldable wing tip portion 9. The wing clutch part 43 and the tip clutch part 45 are in the form of a disc or a plate. The wing clutch part 43 is mounted to the fixed wing 5 in a fixed manner, and the tip clutch part 45 is mounted to the foldable wing tip portion 9 in a fixed manner. The wing clutch part 43 and the tip clutch part 45 can be moved relative to one another between an engaged position and a disengaged position along the hinge axis 13. In the engaged position the tip clutch part 45 is held in a fixed position relative to the wing clutch part 43, so that the foldable wing tip portion 9 is held in a fixed position relative to the fixed wing 5. In the disengaged position the tip clutch part 45 is moveable relative to the wing clutch part 43, specifically rotatable about a clutch axis 47 that coincides with the hinge axis 13, so that the foldable wing tip portion 9 is movable relative to the fixed wing 5. Further, the actuation device 23 is unloaded when the clutch parts 41 are in the engaged position.

The clutch device 39 is configured such that the wing clutch part 43 and the tip clutch part 45 are in the engaged position when the foldable wing tip portion 9 is in the extended position and/or in the folded position, and such that the wing clutch part 43 and the tip clutch part 45 are in the disengaged position when the foldable wing tip portion 9 is moved between the extended position and the folded position.

The wing clutch part 43 has a wing engagement surface 49 and the tip clutch part 45 has a tip engagement surface 51. In the engaged position of the wing clutch part 43 and the tip clutch part 45 the wing engagement surface 49 is engaged to the tip engagement surface 51. The wing engagement surface 49 and the tip engagement surface 51 extend in parallel and are moved to the engaged position in a linear engagement direction normal to the wing and tip engagement surfaces 49, 51 and in parallel to the hinge axis 13.

The wing engagement surface 49 and the tip engagement surface 51 are essentially even and are configured to engage to one another by friction. Alternatively, the wing engagement surface 49 and the tip engagement surface 51 might be uneven and configured to engage to one another by positive-locking of the uneven structure on the wing engagement surface 49 and the tip engagement surface 51. Specifically, the wing engagement surface 49 and the tip engagement surface 51 might be toothed and configured to engage to one another by meshing of the teeth 53. Alternatively, one of the wing engagement surface 49 and the tip engagement surface 51 might have projections 55, and the other one of the wing engagement surface 49 and the tip engagement surface 51 might have corresponding recesses 57 configured for being engaged by the projections 55 for engagement of the wing engagement surface 49 and the tip engagement surface 51. The projections 55 might be formed as bolts 59 and the recesses 57 might be formed as bores 61, such that the bolts 59 engage the bores 61 for engagement of the wing engagement surface 49 and the tip engagement surface 51.

Further, the clutch device 39 is configured such that the wing clutch part 43 and the tip clutch part 45 are moved between the engaged position and the disengaged position along a linear engagement direction 63 that is parallel to the hinge axis 13. The clutch device 39 is arranged aligned with the hinge axis 13. Also, the clutch device 39 defines a clutch axis 47 about which the wing clutch part 43 and the tip clutch part 45 rotate relative to one another when the foldable wing tip portion 9 is rotated about the hinge axis 13 relative to the fixed wing 5. The clutch axis 47 extends perpendicularly to wing engagement surface 49 and to the tip engagement surface 51 and parallel to the engagement direction 63. The clutch axis 47 coincides with the hinge axis 13.

The clutch device 39 comprises a biasing device 65 including several linear springs configured for biasing the wing clutch part 43 and the tip clutch part 45 towards the engaged position. Further, the clutch device 39 comprises a clutch actuation unit 67 configured for moving the wing clutch part 43 and the tip clutch part 45 towards the disengaged position against the biasing force of the biasing device 65. The clutch actuation unit 67 comprises several distinct actuators 68 distributed over the wing clutch part 43 and engaging the tip clutch part 45.

By such a wing as described above, only one arresting device 37 is required for arresting the foldable wing tip portion 9 in both the extended position and the folded position, so that weight, complexity and maintenance efforts can be reduced. Further, a lug-and-bolt arresting unit can be avoided thereby reducing maintenance and cleaning efforts. As a result, a simple, reliable and efficient arresting device 37 can be achieved. While at least one exemplary embodiment of the present invention(s) is disclosed herein, it should be understood that modifications, substitutions and alternatives may be apparent to one of ordinary skill in the art and can be made without departing from the scope of this disclosure.

This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft comprising
a fixed wing,
a foldable wing tip portion mounted to the fixed wing via a hinge which rotates about a hinge axis between an extended position and a folded position,
an actuation device configured to actuate the foldable wing tip portion to move the wing tip portion between the extended position and the folded position, and
an arresting device configured to arrest the foldable wing tip portion in the extended position and/or in the folded position,
wherein the arresting device comprises a clutch device configured to hold the foldable wing tip portion in a fixed position relative to the fixed wing and releasing the foldable wing tip portion to move relative to the fixed wing about the hinge axis by actuation of the actuation device.

2. The wing according to claim 1, wherein the clutch device comprises at least one pair of clutch parts including a wing clutch part mounted to the fixed wing and a tip clutch part mounted and fixed to the foldable wing tip portion,
wherein the wing clutch part and the tip clutch part move relative to one another between an engaged position and a disengaged position,
wherein in the engaged position the tip clutch part is held in a fixed position relative to the wing clutch part to hold the foldable wing tip portion in a fixed position relative to the fixed wing, and
wherein in the disengaged position the tip clutch part is moveable relative to the wing clutch part, so that the foldable wing tip portion is movable relative to the fixed wing.

3. The wing according to claim 2, wherein the clutch device is configured such that the wing clutch part and the tip clutch part are in the engaged position when the foldable wing tip portion is in the extended position and/or in the folded position, and such that the wing clutch part and the tip clutch part are in the disengaged position when the foldable wing tip portion is moved between the extended position and the folded position.

4. The wing according to claim 2, wherein the wing clutch part has a wing engagement surface and the tip clutch part has a tip engagement surface,
wherein in the engaged position of the wing clutch part and the tip clutch part the wing engagement surface is engaged to the tip engagement surface.

5. The wing according to claim 4, wherein the wing engagement surface and/or the tip engagement surface are even and are configured to engage to one another by friction.

6. The wing according to claim 4, wherein the wing engagement surface is uneven and the tip engagement surface is uneven, and the wing engagement surface engages the tip engagement surface to form a positive-locking engagement.

7. The wing according to claim 6, wherein the wing engagement surface and the tip engagement surface are toothed and are configured to engage to one another by meshing of the teeth.

8. The wing according to claim 6, wherein one of the wing engagement surface and the tip engagement surface has at least one projection and the other one of the wing engagement surface and the tip engagement surface has at least one recess configured to engage the projection for engagement of the wing engagement surface and the tip engagement surface.

9. The wing according to claim 8, wherein the at least one projection includes a bolt and the at least one recess includes a bore, wherein the bolt engages the bore for engagement of the wing engagement surface and the tip engagement surface.

10. The wing according to claim 2, wherein the clutch device is configured such that the wing clutch part and the tip clutch part are moved between the engaged position and the disengaged position along a linear engagement direction parallel to the hinge axis.

11. The wing according to claim 2, wherein the clutch device is aligned with the hinge axis, and
wherein the clutch device defines a clutch axis about which the wing clutch part and the tip clutch part rotate relative to one another when the foldable wing tip portion is rotated about the hinge axis relative to the fixed wing,
wherein the clutch axis coincides with the hinge axis.

12. The wing according to claim 2, wherein the clutch device comprises at least two pairs of clutch parts arranged along the hinge axis and each of the at least two pairs of clutch parts includes a wing clutch part mounted to the fixed wing and a tip clutch part mounted to the foldable wing tip portion.

13. An aircraft comprising the wing according to claim 1.

14. The aircraft wing of claim 1, wherein the hinge includes fixed wing parts extending from a tip of the fixed wing, and wing tip parts extending from a root of the foldable wing tip portion and interleaved with the fixed wing parts, wherein apertures in the fixed wing parts and apertures in the wing tip parts are aligned along the hinge axis, and
wherein the clutch device is fixed to one of the fixed wing parts and the tip clutch part is fixed to one of the wing tip parts.

15. A wing for an aircraft comprising
a fixed wing,
a foldable wing tip portion mounted to the fixed wing via a hinge which rotates about a hinge axis between an extended position and a folded position,
an actuation device configured to actuate the foldable wing tip portion to move the wing tip portion between the extended position and the folded position, and
a clutch device configured to arrest the foldable wing tip portion in the extended position and/or in the folded position, wherein the clutch device is configured to hold the foldable wing tip portion in a fixed angular position relative to the fixed wing and release the foldable wing tip portion to rotate relative to the fixed wing about the hinge axis by actuation of the actuation device;

wherein the clutch device comprises at least one pair of clutch parts including a wing clutch part mounted to the fixed wing and a tip clutch part mounted to the foldable wing tip portion, wherein the wing clutch part and the tip clutch part move relative to one another between an engaged position and a disengaged position, wherein in the engaged position the tip clutch part is held in a fixed position relative to the wing clutch part to hold the foldable wing tip portion in a fixed position relative to the fixed wing, wherein in the disengaged position the tip clutch part is moveable relative to the wing clutch part to allow the foldable wing tip portion to be rotated relative to the fixed wing by the actuation device, wherein the clutch device comprises a biasing device configured to bias the wing clutch part and the tip clutch part towards the engaged position, and wherein the clutch device comprises a clutch actuation unit configured to move the wing clutch part and the tip clutch part towards the disengaged position.

16. An aircraft wing comprising a fixed wing include a fixed wing tip, a hinge mounted to the fixed wing tip and configured to rotate about a hinge axis, a foldable wing tip device on which the hinge is mounted wherein the foldable wing tip device is configured to rotate about the hinge axis and relative to the fixed wing between an extended position and a folded position, an actuation device configured to move the foldable wing tip device between the extended position and the folded position, and a clutch including:
  a wing clutch part mounted in a fixed relationship to the fixed wing, and
  a tip clutch part mounted in a fixed relationship to the foldable wing tip device and in a rotatable relationship to the wing clutch part, wherein the tip clutch part rotates relative to the wing clutch part between an engaged position and a disengaged position, wherein in the engaged position the tip clutch part engages the wing clutch part to hold the foldable wing tip portion in a fixed position relative to the fixed wing, wherein in the disengaged position the tip clutch part is free to rotate relative to the wing clutch part to allow the actuation device to rotate the foldable wing tip portion to rotate-relative to the fixed wing, wherein the hinge includes:
  fixed wing parts extending from the fixed wing tip,
  wing tip parts extending from a root of the foldable wing tip device and interleaved with the fixed wing parts, and
  apertures in the fixed wing parts aligned with apertures in the wing tip parts along the hinge axis, wherein the wing clutch part is fixed to one of the fixed wing parts and the tip clutch part is fixed to one of the wing tip parts.

\* \* \* \* \*